United States Patent
Ding et al.

(10) Patent No.: US 11,909,675 B2
(45) Date of Patent: Feb. 20, 2024

(54) INTERFERENCE SOURCE IDENTIFICATION METHOD, RELATED DEVICE, AND COMPUTER STORAGE MEDIUM

(71) Applicant: Huawei Technologies Co., Ltd., Shenzhen (CN)

(72) Inventors: Lv Ding, Nanjing (CN); Jun Wu, Nanjing (CN); Jiyuan Shi, Nanjing (CN); Fuxing Chen, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 513 days.

(21) Appl. No.: 17/173,253

(22) Filed: Feb. 11, 2021

(65) Prior Publication Data
US 2021/0167907 A1   Jun. 3, 2021

Related U.S. Application Data

(63) Continuation of application No. PCT/CN2019/121122, filed on Nov. 27, 2019.

(30) Foreign Application Priority Data

Nov. 28, 2018  (CN) .......................... 201811440927.1

(51) Int. Cl.
  *H04L 5/00*  (2006.01)
  *H04W 72/0446*  (2023.01)
  *H04W 72/541*  (2023.01)

(52) U.S. Cl.
  CPC ....... *H04L 5/0032* (2013.01); *H04W 72/0446* (2013.01); *H04W 72/541* (2023.01)

(58) Field of Classification Search
  CPC ............ H04L 5/0032; H04W 72/0446; H04W 72/541
  See application file for complete search history.

(56) References Cited

U.S. PATENT DOCUMENTS

| | | |
|---|---|---|
| 6,707,798 B1 | 3/2004 | Klein et al. |
| 2006/0098715 A1 | 5/2006 | Amano |
| 2013/0201863 A1 | 8/2013 | Chan et al. |

(Continued)

FOREIGN PATENT DOCUMENTS

| | | | |
|---|---|---|---|
| CN | 101697624 A | * | 4/2010 |
| CN | 101697624 A | | 4/2010 |

(Continued)

OTHER PUBLICATIONS

Yue, W., "4G LTE Network Planning—PRACH Planning, Neighboring Cell Planning, and PCI Planning," 2017, with an English Abstract, 3 pages.

*Primary Examiner* — Chae S Lee
(74) *Attorney, Agent, or Firm* — Conley Rose, P.C.

(57) ABSTRACT

An interference source identification method includes obtaining a first parameter, where the first parameter includes a co-channel interference rate of a first access point in a preset time period, a receive channel utilization rate and a transmit channel utilization rate of a second access point in the preset time period, and a receive frame rate of data received from a first station by the second access point in the preset time period, and determining that the data causes co-channel interference to the first access point when the first parameter meets a preset condition.

20 Claims, 4 Drawing Sheets

(56) References Cited

U.S. PATENT DOCUMENTS

| | | |
|---|---|---|
| 2014/0273812 A1 | 9/2014 | Beeler et al. |
| 2015/0139201 A1* | 5/2015 | Ko .................... H04W 72/541 |
| | | 370/336 |
| 2015/0181501 A1 | 6/2015 | Soga et al. |
| 2016/0056909 A1 | 2/2016 | Yasukawa et al. |
| 2018/0035462 A1 | 2/2018 | Mallik et al. |

FOREIGN PATENT DOCUMENTS

| | | |
|---|---|---|
| CN | 102098787 A | 6/2011 |
| CN | 102684737 A | 9/2012 |
| CN | 103702343 A | 4/2014 |
| CN | 103945429 A | 7/2014 |
| CN | 105792222 A | 7/2016 |
| CN | 108184272 A | 6/2018 |
| CN | 108243424 A | 7/2018 |
| EP | 3176967 A1 | 6/2017 |
| JP | 2014204200 A | 10/2014 |

* cited by examiner

INTERFERENCE SOURCE IDENTIFICATION METHOD, RELATED DEVICE, AND COMPUTER STORAGE MEDIUM

CROSS-REFERENCE TO RELATED APPLICATIONS

This application is a continuation of International Patent Application No. PCT/CN2019/121122 filed on Nov. 27, 2019, which claims priority to Chinese Patent Application No. 201811440927.1 filed on Nov. 28, 2018. The disclosures of the aforementioned applications are hereby incorporated by reference in their entireties.

TECHNICAL FIELD

This application relates to the field of communications technologies, and in particular, to an interference source identification method, a related device, and a computer storage medium.

BACKGROUND

Co-channel interference is interference caused by an interfering signal to a receiver that receives a wanted signal, because a carrier of the interfering signal is same as that of the wanted signal. In a mobile communications system, because frequency resources are limited, a frequency reuse technology is usually used to improve frequency utilization and increase a system capacity. Therefore, there are a plurality of access points (APs) that use a same frequency in a specific area, for example, a conference hall, a student dormitory, or a library. The plurality of APs that use the same frequency are usually deployed to meet a use requirement of a user. When a station (STA) communicates with a target AP connected to the station, the co-channel interference may be caused to another AP adjacent to the target AP. When the co-channel interference occurs in the other AP, an interfering station that causes the co-channel interference to the AP needs to be determined such that the interfering station can be processed, to reduce or eliminate the co-channel interference.

SUMMARY

Embodiments of this application disclose an interference source identification method, a related device, and a computer storage medium, to be able to identify an interference source that causes co-channel interference to an AP.

According to a first aspect, an embodiment of this application discloses an interference source identification method, including obtaining a first parameter, where the first parameter includes a co-channel interference rate of a first access point in a preset time period, a receive channel utilization rate of a second access point in the preset time period, a transmit channel utilization rate of the second access point in the preset time period, and a receive frame rate of data that is sent by a first station and that is received by the second access point in the preset time period, and when the first parameter meets a first preset condition, determining that the data sent by the first station to the second access point causes co-channel interference to the first access point.

With reference to the first aspect, in a first possible implementation of the first aspect, the preset time period includes one or more sampling periods.

The co-channel interference rate is a ratio of the sampling period and a time period in which the first access point receives interference data in the sampling period.

The receive channel utilization rate is a ratio of the sampling period and a time period in which the second access point receives wanted data in the sampling period.

The transmit channel utilization rate is a ratio of the sampling period and a time period in which the second access point sends data in the sampling period.

The receive frame rate is a frame rate of the data that is sent by the first station and that is received by the second access point in the sampling period.

With reference to the first aspect or the first possible implementation of the first aspect, in a second possible implementation of the first aspect, the method includes in a case in which the co-channel interference rate is correlated with the receive channel utilization rate, the co-channel interference rate is not correlated with the transmit channel utilization rate, the receive frame rate is correlated with the receive channel utilization rate, and a receive frame rate mean value of the receive frame rate is greater than a receive frame rate threshold, determining that the data sent by the first station to the second access point causes the co-channel interference to the first access point. The receive frame rate mean value is a mean value of receive frame rates collected in the one or more sampling periods.

With reference to the first aspect or the first or second possible implementation of the first aspect, in a third possible implementation of the first aspect, the method includes, in a case in which an absolute value of a first correlation coefficient between the co-channel interference rate and the receive channel utilization rate is greater than a first correlation threshold, determining that the co-channel interference rate is correlated with the receive channel utilization rate, where the first correlation coefficient includes any one of a Pearson correlation coefficient, a Spearman correlation coefficient, or a Kendall correlation coefficient, in a case in which an absolute value of a second correlation coefficient between the co-channel interference rate and the transmit channel utilization rate is less than a second correlation threshold, determining that the co-channel interference rate is not correlated with the transmit channel utilization rate, where the second correlation coefficient includes any one of the Pearson correlation coefficient, the Spearman correlation coefficient, or the Kendall correlation coefficient, and in a case in which an absolute value of a third correlation coefficient between the receive frame rate and the receive channel utilization rate is greater than a third correlation threshold, determining that the receive frame rate is correlated with the receive channel utilization rate, where the third correlation coefficient includes any one of the Pearson correlation coefficient, the Spearman correlation coefficient, or the Kendall correlation coefficient.

With reference to any one of the first aspect or the first to the third possible implementations of the first aspect, in a fourth possible implementation of the first aspect, the method includes, in a case in which an absolute value of a fourth correlation coefficient between the co-channel interference rate and the receive channel utilization rate is less than a fourth correlation threshold, determining that the co-channel interference rate is correlated with the receive channel utilization rate, in a case in which an absolute value of a fifth correlation coefficient between the co-channel interference rate and the transmit channel utilization rate is greater than a fifth correlation threshold, determining that the co-channel interference rate is not correlated with the transmit channel utilization rate, and in a case in which an absolute value of a sixth correlation coefficient between the receive frame rate and the receive channel utilization rate is less than a sixth correlation threshold, determining that the receive frame rate is correlated with the receive channel utilization rate.

The fourth correlation coefficient, the fifth correlation coefficient, and the sixth correlation coefficient are time warping distances.

With reference to any one of the first aspect or the first to the fourth possible implementations of the first aspect, in a fifth possible implementation of the first aspect, the method includes determining a second parameter including any one or more of a co-channel interference rate mean value, a co-channel interference rate peak value, or a co-channel interference rate proportion, where the co-channel interference rate mean value is a mean value of a plurality of co-channel interference rates collected in the preset time period, the co-channel interference rate peak value is a maximum value of the plurality of co-channel interference rates, and the co-channel interference rate proportion is a proportion of co-channel interference rates that are greater than the co-channel interference rate mean value and that are in the plurality of co-channel interference rates, and when each parameter in the second parameter meets a respective second preset condition, and the first parameter meets the first preset condition, determining that the data sent by the first station to the second access point causes the co-channel interference to the first access point.

A preset condition that the co-channel interference rate mean value meets includes that the co-channel interference rate mean value is greater than a co-channel interference rate mean value threshold.

A preset condition that the co-channel interference rate peak value meets includes that the co-channel interference rate peak value is greater than a co-channel interference rate peak value threshold.

A preset condition that the co-channel interference rate proportion meets includes that the co-channel interference rate proportion is greater than a co-channel interference rate proportion threshold.

With reference to any one of the first aspect or the first to the fifth possible implementations of the first aspect, in a sixth possible implementation of the first aspect, the obtaining a first parameter includes obtaining the first parameter collected by a collector.

Whether data sent by a station in a coverage area of the second access point causes the co-channel interference to the first access point can be determined by implementing the interference source identification method in this embodiment of this application. In a case in which the data sent by the station in the coverage area of the second access point causes the co-channel interference to the first access point, an interfering station that is in the coverage area of the second access point and that causes the co-channel interference to the first access point may be further determined. In this way, the station may be processed, to reduce or eliminate the co-channel interference caused by the station to the first access point.

According to a second aspect, an embodiment of this application provides an interference source identification apparatus. The apparatus includes an obtaining module configured to obtain a first parameter, where the first parameter includes a co-channel interference rate of a first access point in a preset time period, a receive channel utilization rate of a second access point in the preset time period, a transmit channel utilization rate of the second access point in the preset time period, and a receive frame rate of data that is sent by a first station and that is received by the second access point in the preset time period, and a processing module configured to, when the first parameter meets a preset condition, determine that the data sent by the first station to the second access point causes co-channel interference to the first access point.

With reference to the second aspect, in a first possible implementation of the second aspect, the preset time period includes one or more sampling periods.

The co-channel interference rate is a ratio of the sampling period and a time period in which the first access point receives interference data in the sampling period.

The receive channel utilization rate is a ratio of the sampling period and a time period in which the second access point receives wanted data in the sampling period.

The transmit channel utilization rate is a ratio of the sampling period and a time period in which the second access point sends data in the sampling period.

The receive frame rate is a frame rate of the data that is sent by the first station and that is received by the second access point in the sampling period.

With reference to the second aspect or the first possible implementation of the second aspect, in a second possible implementation of the second aspect, the processing module is further configured to, in a case in which the co-channel interference rate is correlated with the receive channel utilization rate, the co-channel interference rate is not correlated with the transmit channel utilization rate, the receive frame rate is correlated with the receive channel utilization rate, and a receive frame rate mean value of the receive frame rate is greater than a receive frame rate threshold, determine that the data sent by the first station to the second access point causes the co-channel interference to the first access point. The receive frame rate mean value is a mean value of receive frame rates collected in the one or more sampling periods.

With reference to the second aspect or the first or second possible implementation of the second aspect, in a third possible implementation of the second aspect, the processing module is further configured to, in a case in which an absolute value of a first correlation coefficient between the co-channel interference rate and the receive channel utilization rate is greater than a first correlation threshold, determine that the co-channel interference rate is correlated with the receive channel utilization rate, where the first correlation coefficient includes any one of a Pearson correlation coefficient, a Spearman correlation coefficient, or a Kendall correlation coefficient, in a case in which an absolute value of a second correlation coefficient between the co-channel interference rate and the transmit channel utilization rate is less than a second correlation threshold, determine that the co-channel interference rate is not correlated with the transmit channel utilization rate, where the second correlation coefficient includes any one of the Pearson correlation coefficient, the Spearman correlation coefficient, or the Kendall correlation coefficient, and in a case in which an absolute value of a third correlation coefficient between the receive frame rate and the receive channel utilization rate is greater than a third correlation threshold, determine that the receive frame rate is correlated with the receive channel utilization rate, where the third correlation coefficient includes any one of the Pearson correlation coefficient, the Spearman correlation coefficient, or the Kendall correlation coefficient.

With reference to the second aspect or the first to the third possible implementations of the second aspect, in a fourth possible implementation of the second aspect, the processing module is further configured to, in a case in which an absolute value of a fourth correlation coefficient between the co-channel interference rate and the receive channel utilization rate is less than a fourth correlation threshold, determine that the co-channel interference rate is correlated with the receive channel utilization rate, in a case in which an absolute value of a fifth correlation coefficient between the co-channel interference rate and the transmit channel utilization rate is greater than a fifth correlation threshold, determine that the co-channel interference rate is not correlated with the transmit channel utilization rate, and in a case in which an absolute value of a sixth correlation coefficient between the receive frame rate and the receive channel utilization rate is less than a sixth correlation threshold, determine that the receive frame rate is correlated with the receive channel utilization rate.

The fourth correlation coefficient, the fifth correlation coefficient, and the sixth correlation coefficient are time warping distances.

With reference to the second aspect or the first to the fourth possible implementations of the second aspect, in a fifth possible implementation of the second aspect, the processing module is further configured to determine a second parameter including any one or more of a co-channel interference rate mean value, a co-channel interference rate peak value, or a co-channel interference rate proportion, where the co-channel interference rate mean value is a mean value of a plurality of co-channel interference rates collected in the one or more sampling periods, the co-channel interference rate peak value is a maximum value of the plurality of co-channel interference rates, and the co-channel interference rate proportion is a proportion of co-channel interference rates that are greater than the co-channel interference rate mean value and that are in the plurality of co-channel interference rates, and when each parameter in the second parameter meets a respective second preset condition, and the first parameter meets the first preset condition, determine that the data sent by the first station to the second access point causes the co-channel interference to the first access point.

A preset condition that the co-channel interference rate mean value meets includes that the co-channel interference rate mean value is greater than a co-channel interference rate mean value threshold.

A preset condition that the co-channel interference rate peak value meets includes that the co-channel interference rate peak value is greater than a co-channel interference rate peak value threshold.

A preset condition that the co-channel interference rate proportion meets includes that the co-channel interference rate proportion is greater than a co-channel interference rate proportion threshold.

With reference to the second aspect or the first to the fifth possible implementations of the second aspect, in a sixth possible implementation of the second aspect, the obtaining module is further configured to obtain the first parameter collected by a collector.

According to a third aspect, an embodiment of this application provides a network device, including a processor, a communications interface, and a memory. The memory is configured to store an instruction. The processor is configured to execute the instruction. The communications interface is configured to receive or send data. When executing the instruction, the processor performs the method described in any one of the first aspect or the possible implementations of the first aspect.

According to a fourth aspect, this application provides a non-transient computer storage medium. The non-transient computer storage medium stores a computer program. When executing the computer program, a processor implements the method described in any one of the first aspect or the possible implementations of the first aspect.

BRIEF DESCRIPTION OF DRAWINGS

To describe the technical solutions in some of the embodiments of this application more clearly, the following briefly describes the accompanying drawings for describing the embodiments. The accompanying drawings in the following description show some embodiments of this application, and a person of ordinary skill in the art may still derive other drawings from these accompanying drawings without creative efforts.

DESCRIPTION OF EMBODIMENTS

With reference to accompanying drawings, the following first describes a communication scenario involving co-channel interference.

Figure 1:
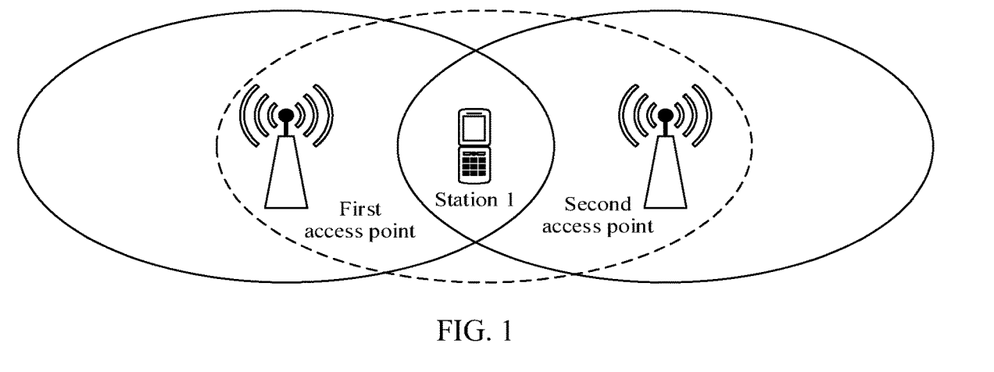
FIG. 1 is a schematic diagram in which access points are mutually hidden nodes according to an embodiment of this application.

Scenario 1: As shown in FIG. 1, a first access point AP 1 and a second access point AP 2 use a same channel, and the AP 1 and the AP 2 cannot directly communicate with each other due to a distance or another factor. In this case, the AP 1 may be referred to as a hidden node of the AP 2, and the AP 2 is referred to as a hidden node of the AP 1, namely, the AP 1 and the AP 2 are mutually hidden nodes. A STA 1 is located in an overlapping coverage area of the AP 1 and the AP 2, and the AP 1 and the AP 2 are located in a signal coverage area of the STA 1. If the STA 1 communicates with the AP 2, when the STA 1 sends a signal to the AP 2, the signal sent by the STA 1 is also received by the AP 1. Therefore, co-channel interference is caused to the AP 1.

Figure 2:
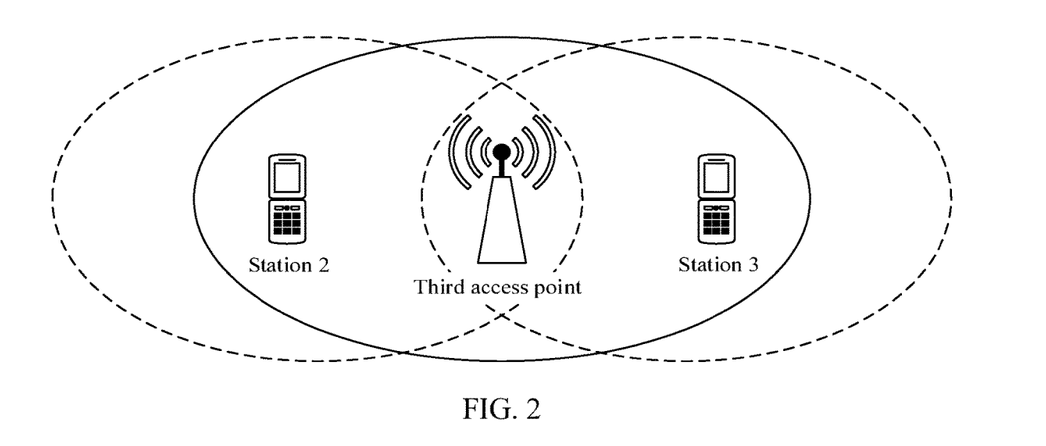
FIG. 2 is a schematic diagram in which stations are mutually hidden nodes according to an embodiment of this application.

Scenario 2: As shown in FIG. 2, both a STA 2 and a STA 3 may directly perform data transmission with a third access point AP 3. However, the STA 2 and the STA 3 cannot directly communicate with each other due to a distance or another factor, namely, the STA 2 and the STA 3 are mutually hidden nodes. If the STA2 and the STA3 simultaneously send signals to the AP, because the AP cannot simultaneously process the two signals, the AP cannot correctly parse the signals sent by the STA2 and the STA3. Therefore, a data transmission failure is caused.

The scenario in FIG. 1 is referred to as a scenario in which APs are mutually hidden nodes, and the scenario in FIG. 2 is referred to as a scenario in which STAs are mutually hidden nodes. For the scenario described in FIG. 2, a request to send (RTS)/clear to send (CTS) solution may be used to resolve a problem that the STAs are mutually hidden nodes. Further, FIG. 2 is still used as an example. When the STA 2 needs to send data to the AP 3, the STA 2 first sends an RTS frame to the AP 3. The RTS frame is used to reserve a channel use right for the AP 3. After receiving the RTS frame, the AP 3 sends, to a STA in a coverage area of the AP 3, a CTS frame that replies to the RTS frame. After receiving the CTS frame, the STA 2 may send the data to the AP 3. After receiving the CTS frame, another STA such as the STA 3 keeps silent, to prevent two or more STAs from simultaneously sending data to the AP.

However, in the foregoing scenario in which the APs are mutually hidden nodes, if the RTS/CTS solution is also used, the STA 1 sends an RTS frame to the AP 2 when the STA 1 needs to communicate with the AP 2. Because a STA can communicate with only one AP, the AP 1 discards the RTS frame because a destination address of the RTS frame sent by the STA 1 does not match. Therefore, the AP 1 does not send a CTS frame for the RTS frame, to keep another STA in a coverage area of the AP 1 silent. In this case, the AP 1 receives both data sent by the STA 1 and data sent by another STA in the coverage area of the AP 1. Therefore, data sent by the STA 1 to the AP 2 causes the co-channel interference to the AP 1. The RTS/CTS solution cannot resolve a co-channel interference problem in the scenario in which the APs are mutually hidden nodes. To resolve the co-channel interference problem in this scenario, the scenario in which the APs are mutually hidden nodes needs to be first identified, and then an interference source STA is identified and processed. For example, the interference source STA is forced to switch a frequency band or the STA is guided to access APs of different channels, to eliminate the co-channel interference. This improves network performance.

Figure 3:
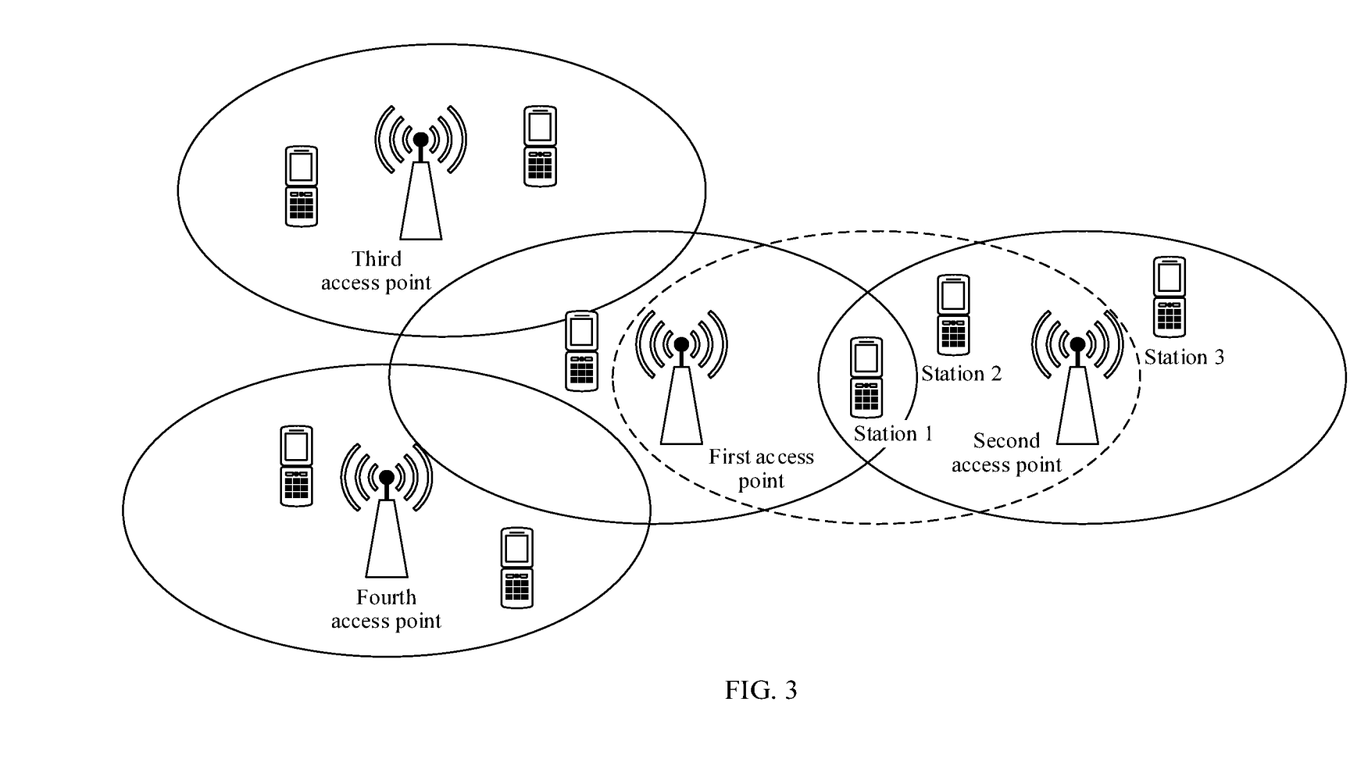
FIG. 3 is a schematic diagram of a scenario in which an interference source identification method is applied according to an embodiment of this application.
Figure 4:
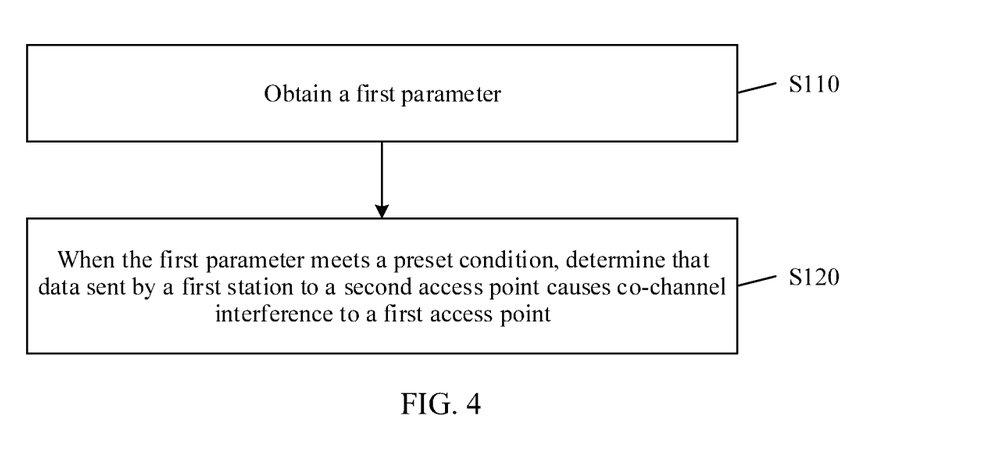
FIG. 4 is a schematic flowchart of an interference source identification method according to an embodiment of this application.

To resolve a problem of identifying the scenario in which the APs are mutually hidden nodes and then identifying the interference source STA, an embodiment of this application provides an interference source identification method. In this embodiment of this application, a network shown in FIG. 3 is used to describe the interference source identification method provided in this application. In FIG. 3, the STA may be a terminal device such as a mobile phone, a tablet computer, a personal digital assistant (PDA), a mobile internet device (MID), or a wearable device. A specific form or type of the STA is not limited in this application, and the AP may be a device that can establish a wireless local area network, such as a wireless router. This is not limited in this embodiment of this application. Based on the network shown in FIG. 3, referring to FIG. 4, FIG. 4 is a schematic flowchart of an interference source identification method according to an embodiment of this application. The method includes the following steps.

S110: Obtain a first parameter.

In this embodiment of this application, the first parameter includes a co-channel interference rate $CCI_{AP1}$ of a first access point AP 1 in a preset time period, a receive channel utilization rate $RX_{AP2}$ of a second access point AP 2 in the preset time period, a transmit channel utilization rate $TX_{AP2}$ of the AP 2 in the preset time period, and a receive frame rate $V_{STA}$ of data that is sent by a first station STA 1 and that is received by the AP 2 in the preset time period. The preset time period includes one or more sampling periods. The co-channel interference rate is a ratio of the sampling period and a time period in which the AP 1 receives interference data in the sampling period. The receive channel utilization rate is a ratio of the sampling period and a time period in which the AP 2 receives wanted data in the sampling period. The transmit channel utilization rate is a ratio of the sampling period and a time period in which the AP 2 sends data in the sampling period. The receive frame rate is a frame rate of the data that is sent by the STA 1 and that is received by the AP 2 in the sampling period.

For example, if the sampling period is 10 seconds, and the preset time period is 50 seconds, in the sampling period, a time period occupied by the AP 1 to receive the wanted data is 4 seconds, a time period occupied by the AP 1 to send data is 2 seconds, and the time period occupied by the AP 1 to receive the interference data is 3 seconds. In this case, the co-channel interference rate of the AP 1 is 30%. If the time period occupied by the AP 2 to receive the wanted data is 5 seconds, the time period occupied by the AP 2 to send the data is 2 seconds, and a time period occupied by the AP 2 to receive the interference data is 1 second, in this sampling period, the receive channel utilization rate of the AP 2 is 50%, the transmit channel utilization rate of the AP 2 is 20%, and a co-channel interference rate of the AP 2 is 10%. If in the sampling period, the AP 2 receives data sent by the STA 1 and the STA 2. A time period occupied by the AP 2 to receive the data sent by the STA 1 is 2 seconds, and 2400 frames of data sent by the STA 1 are received in total. In the sampling period, a receive frame rate of the STA 1 corresponding to the AP 2 is 1200, and this also indicates that a transmit frame rate of the STA 1 in the sampling period is 1200. A collector collects, every 10 seconds, the co-channel interference rate of the AP 1, the receive channel utilization rate of the AP 2, the transmit channel utilization rate of the AP 2, and the receive frame rate of the data that is sent by the first station STA 1 and that is received by the AP 2. In the preset time period, the collector collects the foregoing data five times to form the first parameter. An interference source identification device obtains, every 50 seconds, the first parameter collected by the collector.

In this embodiment of this application, the collector may be located in an AP, and one collector is integrated into each AP. Alternatively, the collector may be an independent device, and is wiredly or wirelessly connected to the AP and the interference source identification device. The collector may be further integrated into the interference source identification device. This is not limited in this embodiment of this application.

S120: When the first parameter meets a preset condition, determine that data sent by a first station to a second access point causes co-channel interference to a first access point.

In this embodiment of this application, the preset condition includes the following.

A preset condition 1: The co-channel interference rate $CCI_{AP1}$ of the AP 1 in the preset time period is correlated with the receive channel utilization rate $RX_{AP2}$ of the AP 2 in the preset time period.

A preset condition 2: The co-channel interference rate $CCI_{AP1}$ of the AP 1 in the preset time period is not correlated with the transmit channel utilization rate $TX_{AP2}$ of the AP 2 in the preset time period.

A preset condition 3: The receive frame rate $V_{STA}$ of the data that is sent by the STA 1 and that is received by the AP 2 in the preset time period is correlated with the receive channel utilization rate $RX_{AP2}$ of the second access point AP 2 in the preset time period.

A preset condition 4: A receive frame rate mean value $V_{mean}$ of the receive frame rate $V_{STA}$ of the data that is sent by the STA 1 and that is received by the AP 2 in the preset time period is greater than a receive frame rate threshold $TH_{sta}$, where the receive frame rate mean value $V_{mean}$ is a mean value of a plurality of receive frame rates collected in a plurality of sampling periods in the preset time period.

When the first parameter meets the foregoing four preset condition, it is determined that the data sent by the first station to the second access point causes the co-channel interference to the first access point.

In this embodiment of this application, whether two groups of data are correlated may be determined by calculating a correlation coefficient between the two groups of data and determining, based on whether the correlation coefficient between the two groups of data meets a threshold requirement, whether the two groups of data are correlated. The correlation coefficient used to determine whether the two groups of data are correlated may be any one of four coefficients a Pearson correlation coefficient, a Spearman correlation coefficient, a Kendall correlation coefficient, or a time warping distance. This is not limited in this embodiment of this application. The time warping distance is obtained through calculation according to a dynamic time warping (DTW) algorithm.

After obtaining the first parameter, the interference source identification device calculates a correlation coefficient between the co-channel interference rate $CCI_{AP1}$ of the AP 1 in the preset time period and the receive channel utilization rate $RX_{AP2}$ of the AP 2 in the preset time period, to determine whether the co-channel interference rate $CCI_{AP1}$ is correlated with the receive channel utilization rate $RX_{AP2}$. The interference source identification device calculates a correlation coefficient between the co-channel interference rate $CCI_{AP}$ of the AP 1 in the preset time period and the transmit channel utilization rate $TX_{AP2}$ of the AP 2 in the preset time period, to determine whether the co-channel interference rate $CCI_{AP1}$ is not correlated with the transmit channel utilization rate $TX_{AP2}$. The interference source identification device calculates a correlation coefficient between the receive frame rate $V_{STA}$ of the data that is sent by the STA 1 that is received by the AP 2 and the receive channel utilization rate $RX_{AP2}$ of the AP 2 in the preset time period, to determine whether the receive frame rate $V_{STA}$ is correlated with the receive channel utilization rate $RX_{AP2}$.

For example, the correlation coefficient is the Pearson correlation coefficient, and it is determined whether the co-channel interference rate $CCI_{AP1}$ is correlated with the channel utilization rate $RX_{AP2}$. After obtaining the first parameter, the interference source identification device calculates the Pearson correlation coefficient between two groups of data: the co-channel interference rate $CCI_{AP1}$ and the receive channel utilization rate $RX_{AP2}$. If the Pearson correlation coefficient between the two groups of data is greater than a first threshold, it is determined that the co-channel interference rate $CCI_{AP1}$ is correlated with the receive channel utilization rate $RX_{AP2}$. If the Pearson correlation coefficient between the two groups of data is less than or equal to the first threshold, it is determined that the co-channel interference rate $CCI_{AP1}$ is not correlated with the receive channel utilization rate $RX_{AP2}$.

In this embodiment of this application, when absolute values of the Pearson correlation coefficient, the Spearman correlation coefficient, and the Kendall correlation coefficient are all greater than a preset threshold, it indicates that two groups of data are correlated. When an absolute value of the time warping distance is less than the preset threshold, it indicates that the two groups of data are correlated. Therefore, when it is determined, according to a correlation coefficient between the two groups of data, whether the two groups of data are correlated, types of correlation coefficients selected for calculation are different, and requirements to be met for determining whether the two groups of data are correlated are also different. Further, requirements that meet the preset condition 1, the preset condition 2, and the preset condition 3 include the following.

In a case in which an absolute value of a first correlation coefficient between the co-channel interference rate and the receive channel utilization rate is greater than a first correlation threshold, it is determined that the co-channel interference rate is correlated with the receive channel utilization rate. The first correlation coefficient includes any one of the Pearson correlation coefficient, the Spearman correlation coefficient, or the Kendall correlation coefficient. Alternatively, in a case in which an absolute value of a fourth correlation coefficient between the co-channel interference rate and the receive channel utilization rate is less than a fourth correlation threshold, it is determined that the co-channel interference rate is correlated with the receive channel utilization rate. The fourth correlation coefficient is the time warping distance.

In a case in which an absolute value of an absolute value of a second correlation coefficient between the co-channel interference rate and the transmit channel utilization rate is less than a second correlation threshold, it is determined that the co-channel interference rate is not correlated with the transmit channel utilization rate. The second correlation coefficient includes any one of the Pearson correlation coefficient, the Spearman correlation coefficient, or the Kendall correlation coefficient. Alternatively, in a case in which a fifth correlation coefficient between the co-channel interference rate and the transmit channel utilization rate is greater than a fifth correlation threshold, it is determined that the co-channel interference rate is not correlated with the transmit channel utilization rate. The fifth correlation coefficient is the time warping distance.

In a case in which an absolute value of a third correlation coefficient between the receive frame rate and the receive channel utilization rate is greater than a third correlation threshold, it is determined that the receive frame rate is correlated with the receive channel utilization rate. The third correlation coefficient includes any one of the Pearson correlation coefficient, the Spearman correlation coefficient, or the Kendall correlation coefficient. Alternatively, in a case in which an absolute value of a sixth correlation coefficient between the receive frame rate and the receive channel utilization rate is less than a sixth correlation threshold, it is determined that the receive frame rate is correlated with the receive channel utilization rate. The sixth correlation coefficient is the time warping distance.

The first correlation threshold, the second correlation threshold, and the third correlation threshold are all positive real numbers less than 1. The second correlation threshold is less than or equal to the first correlation threshold, and the second correlation threshold is less than or equal to the third correlation threshold. The fourth correlation threshold is less than or equal to the fifth correlation threshold, and the sixth correlation threshold is less than or equal to the fifth correlation threshold.

In this embodiment of this application, when any one of the three coefficients the Pearson correlation coefficient, the Spearman correlation coefficient, or the Kendall correlation coefficient, of the two groups of data is calculated. Quantities of pieces of data in the two groups of data need to be the same. However, when the DTW algorithm is used to calculate the time warping distance between the two groups of data, it is not required that the quantities of pieces of data in the two groups of data are consistent. Therefore, after obtaining the first parameter, the interference source identification device first obtains the quantities of pieces of data that are in the two groups of data and that participate in the calculation. If the quantities of pieces of data in the two groups of data are the same, the correlation coefficient may be any one of the four coefficient types the Pearson correlation coefficient, the Spearman correlation coefficient, the Kendell correlation coefficient, or the time warping distance. If the quantities of pieces of data in the two groups of data are different, the correlation coefficient is the time warping distance.

For example, if the interference source identification device determines that a quantity of pieces of data included in the co-channel interference rate $CCI_{AP1}$ is the same as a quantity of pieces of data included in the receive channel utilization rate $RX_{AP2}$, any one of the following correlation coefficients between the co-channel interference rate $CCI_{AP1}$ and the receive channel utilization rate $RX_{AP2}$ may be calculated the Pearson correlation coefficient, the Spearman correlation coefficient, the Kendall correlation coefficient, or the time warping distance, to determine whether the co-channel interference rate $CCI_{AP1}$ is correlated with the receive channel utilization rate $RX_{AP2}$. If the interference source identification device determines that the quantity of pieces of data included in the co-channel interference rate $CCI_{AP1}$ is different from the quantity of pieces of data included in the receive channel utilization rate $RX_{AP2}$, only the time warping distance between the co-channel interference rate $CCI_{AP1}$ and the receive channel utilization rate $RX_{AP2}$ can be calculated, to determine, based on the time warping distance, whether the co-channel interference rate $CCI_{AP1}$ is correlated with the receive channel utilization rate $RX_{AP2}$.

It may be understood that, when the DTW algorithm is used to calculate the time warping distance between the two groups of data, it is not required that the quantities of pieces of data in the two groups of data are consistent. All correlation coefficients may be set to time warping distances to avoid that the interference source identification device needs to determine whether the quantities of pieces of data that are in the two groups of data and that participate in the calculation of the correlation coefficient are the same each time. In this way, calculation workload of the interference source identification device is reduced, and calculation efficiency is improved. This is not limited in this embodiment of this application.

Figure 5:
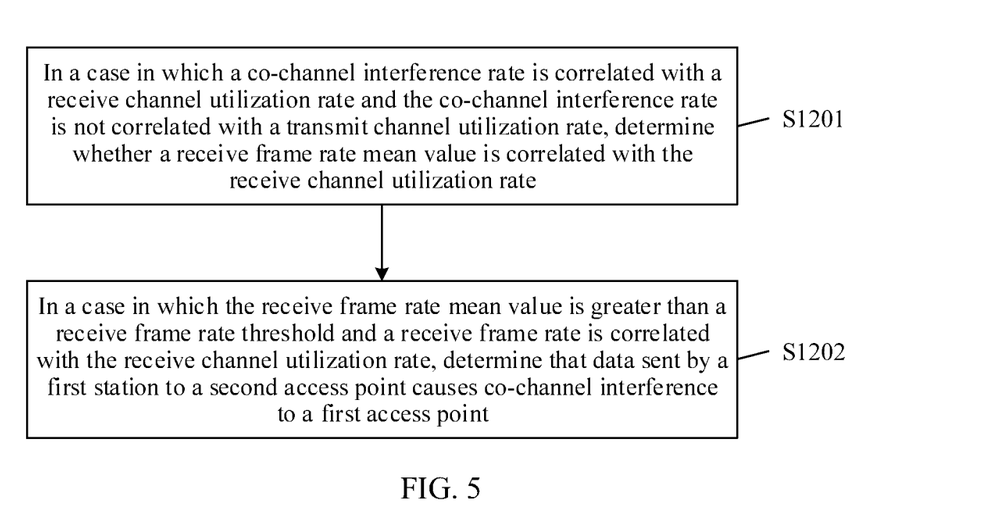
FIG. 5 is a schematic flowchart of another interference source identification method according to an embodiment of this application.

In a possible implementation, based on the foregoing description of the scenario in FIG. 1, when the STA 1 causes the co-channel interference to the AP 1, the AP 2 is a hidden node of the AP 1, and the STA 1 sends the data to the AP 2. To be specific, when it is determined that the data sent by the STA 1 to the AP 2 causes the co-channel interference to the AP 1, it may be first determined that the AP 2 is the hidden node of the AP 1, and then it is determined that the data sent by the STA 1 to the AP 2 causes the co-channel interference to the AP 1. As shown in FIG. 5, the step S120 may include the following steps.

S1201: In a case in which a co-channel interference rate is correlated with a receive channel utilization rate and the co-channel interference rate is not correlated with a transmit channel utilization rate, determine that a receive frame rate mean value and a receive frame rate are correlated with the receive channel utilization rate.

After obtaining the first parameter, the interference source identification device first calculates a correlation coefficient between the co-channel interference rate and the receive channel utilization rate and a correlation coefficient between the co-channel interference rate and the transmit channel utilization rate. If the absolute value of the first correlation coefficient between the co-channel interference rate and the receive channel utilization rate is greater than the first correlation threshold, or if an absolute value of the fourth correlation coefficient between the co-channel interference rate and the receive channel utilization rate is less than the fourth correlation threshold, it is determined that the co-channel interference rate is correlated with the receive channel utilization rate, that is, the data received by the AP 2 causes the co-channel interference to the AP 1. If the absolute value of the second correlation coefficient between the co-channel interference rate and the transmit channel utilization rate is less than the second correlation threshold, or the absolute value of the fifth correlation coefficient between the co-channel interference rate and the transmit channel utilization rate is greater than the fifth correlation threshold, it is determined that the co-channel interference rate is not correlated with the transmit channel utilization rate, that is, the data sent by the AP 2 does not cause the interference to the AP 1. Because the data sent by the AP 2 does not cause the co-channel interference to the AP 1, it indicates that the AP 2 and the AP 1 cannot directly communicate with each other, and the data received by the AP 2 causes the co-channel interference to the AP 1. This indicates that data sent by a STA that communicates with the AP 2 and that is in a coverage area of the AP 2 causes the co-channel interference to the AP 1, namely, the AP 2 is the hidden node of the AP 1.

After the AP 2 is determined as the hidden node of the AP 1, the receive frame rate mean value corresponding to receive frame rates collected in a plurality of collection periods in the preset time period and a correlation coefficient between the receive frame rate and the receive channel utilization rate are calculated. In a case in which the absolute value of the third correlation coefficient between the receive frame rate and the receive channel utilization rate is greater than the third correlation threshold, or in a case in which the absolute value of the sixth correlation coefficient between the receive frame rate and the receive channel utilization rate is less than the sixth correlation threshold, it is determined that the receive frame rate is correlated with the receive channel utilization rate. In a case in which the absolute value of the third correlation coefficient between the receive frame rate and the receive channel utilization rate is less than or equal to the third correlation threshold, or the absolute value of the sixth correlation coefficient between the receive frame rate and the receive channel utilization rate is greater than or equal to the sixth correlation threshold, it is determined that the receive frame rate is not correlated with the receive channel utilization rate. The receive frame rate mean value may be any one of an arithmetic mean value, a geometric mean value, or a weighted mean value of the plurality of receive frame rates. This is not limited in this embodiment of this application.

S1202: In a case in which the receive frame rate mean value is greater than a receive frame rate threshold and the receive frame rate is correlated with the receive channel utilization rate, determine that the data sent by the STA 1 to the AP 2 causes the co-channel interference to the AP 1.

After it is determined whether the receive frame rate mean value $V_{mean}$ and the receive frame rate are correlated with the receive channel utilization rate, if the $V_{mean}$ is greater than the receive frame rate threshold $TH_{sta}$, and the receive frame rate is correlated with the receive channel utilization rate, it indicates that the data sent by the STA 1 in the coverage area of the AP 2 to the AP 2 causes the co-channel interference to the AP 1, and the STA 1 is a co-channel interference source of the AP 1.

The co-channel interference rate of the first access point in the preset time period, the receive channel utilization rate of the second access point in the preset time period, the transmit channel utilization rate of the second access point in the preset time period, and the receive frame rate of the data that is sent by the first station and that is received by the second access point in the preset time period can be obtained by implementing the interference source identification method in this embodiment of this application, to determine whether the data sent by the station in the coverage area of the second access point causes the co-channel interference to the first access point. In a case in which the data sent by the station in the coverage area of the second access point causes the co-channel interference to the first access point, an interfering station that is in the coverage area of the second access point and that causes the co-channel interference to the first access point may be further determined such that the station may be processed, to reduce or eliminate the co-channel interference caused by the station to the first access point.

Optionally, after a plurality of co-channel interference rates $CCI_{AP1}=\{C_1, C_2, \ldots, C_i\}$ that are of the AP 1 and that are collected in the plurality of sampling periods in the preset time period are obtained, any one or more of a co-channel interference rate mean value $CCI_{mean}$, a co-channel interference rate peak value $CCI_{max}$, or a co-channel interference rate proportion $CCI_{pro}$ may be obtained through calculation according to the plurality of co-channel interference rates. The $CCI_{mean}$ is a mean value of the plurality of co-channel interference rates in the preset time period. The $CCI_{max}$ is a maximum value of the plurality of co-channel interference rates in the preset time period. The $CCI_{pro}$ is a proportion of co-channel interference rates that are greater than the co-channel interference rate mean value and that are in the plurality of co-channel interference rates in the preset time period. The $CCI_{mean}$ may be any one of an arithmetic mean value, a geometric mean value, or a weighted mean value of the plurality of co-channel interference rates. In this embodiment of this application, the arithmetic mean value is used as an example for description. For example, when the $CCI_{AP1}=\{35\%, 28\%, 41\%, 25\%, 26\%\}$, the $CCI_{mean}$ is 31%, the $CCI_{max}$ is 41%, and the $CCI_{pro}$ is 40%.

After any one or more of pieces of data of the $CCI_{mean}$, the $CCI_{max}$, or the $CCI_{pro}$ are obtained according to the plurality of co-channel interference rates $CCI_{AP1}=\{C_1, C_2, \ldots, C_i\}$ of the AP1, any one or more of pieces of data of the $CCI_{mean}$, the $CCI_{max}$, or the $CCI_{pro}$ are second parameters. In the step S1201, in addition to that the co-channel interference rate is correlated with the receive channel utilization rate and that the co-channel interference rate is not correlated with the transmit channel utilization rate, each parameter in the second parameter further needs to meet a respective corresponding preset condition. In this way, the AP 2 can be determined as the hidden node of the AP1, to determine whether the receive frame rate is correlated with the receive channel utilization rate.

The preset condition that the $CCI_{mean}$ needs to meet is that the $CCI_{mean}$ is greater than a co-channel interference rate mean value threshold $TH_{mean}$.

The preset condition that the $CCI_{max}$ needs to meet is that the $CCI_{max}$ is greater than a co-channel interference rate peak value threshold $TH_{max}$.

The preset condition that the $CCI_{pro}$ needs to meet is that the $CCI_{pro}$ is greater than a co-channel interference rate proportion threshold $TH_{pro}$.

Optionally, in the foregoing step S1201, in a case in which the co-channel interference rate is correlated with the receive channel utilization rate and the co-channel interference rate is not correlated with the transmit channel utilization rate, any one or more of a receive frame rate peak value $V_{max}$ or a receive frame rate proportion $V_{pro}$ may be further obtained through calculation according to a plurality of receive frame rates $V_{STA}=\{V_1, V_2, \ldots, V_i\}$ collected in the plurality of sampling periods in the preset time period. The receive frame rate peak $V_{max}$ is a maximum value of the plurality of receive frame rates. The receive frame rate proportion $V_{pro}$ is a proportion of receive frame rates that are greater than the receive frame rate mean value $V_{mean}$ and that are in the plurality of receive frame rates. The $V_{mean}$ may be any one of the arithmetic mean value, the geometric mean value, or the weighted mean value of the plurality of co-channel interference rates. In this embodiment of this application, the arithmetic mean value is used as an example for description. For example, when the $V_{STA}=\{1200, 1000, 1100, 1250, 1050\}$, the $V_{mean}$ is 1120, the $V_{max}$ is 1250, and the $V_{pro}$ is 40%.

After any one or more of pieces of data of the $V_{max}$ or the $V_{pro}$ are obtained according to the receive frame rates $V_{STA}=\{V_1, V_2, \ldots, V_i\}$, any one or more of pieces of data of the $V_{max}$ or the $V_{pro}$ is a third parameter. In the foregoing step S1202, when it is determined that the data sent by the STA 1 to the AP 2 causes the co-channel interference to the AP 1, in addition to that the receive frame rate mean value $V_{mean}$ is greater than the receive frame rate threshold $TH_{sta}$ and that the receive frame rate is correlated with the receive channel utilization rate, each parameter in the third parameter further needs to meet a respective corresponding preset condition.

The preset condition that the $V_{max}$ needs to meet is that the $V_{max}$ is greater than a receive frame rate peak value threshold.

The preset condition that the $V_{pro}$ needs to meet is that the $V_{pro}$ is greater than a received frame rate proportion threshold.

In the foregoing embodiment, the STA 1 in the coverage area of the AP 2 is used as an example to describe how to determine, after the AP 2 is determined as the hidden node of the AP 1, that the STA 1 in the coverage area of the AP 2 causes the co-channel interference to the AP 1 when sending the data to the AP 2. According to a same method, the interference source identification device may obtain a transmit frame rate (that is, a receive frame rate of data that is sent by the STA and that is received by the AP 2) of any STA other than the STA 1 in the coverage area of the AP 2. The interference source identification device determines whether data sent by any STA in the coverage area of the AP 2 causes the co-channel interference to the AP 1, to find all STAs that are in the coverage area of the AP 2 and that cause the co-channel interference to the AP 1.

It may be understood that, according to the method in the foregoing embodiments, the interference source identification device may further obtain parameters such as a transmit channel utilization rate and a receive channel utilization rate of an access point such as the AP 3 in FIG. 3. The interference source identification device determines whether another access point such as the AP 3 is the hidden node of the AP 1, to further determine a plurality of hidden nodes of the AP 1 and a STA that causes the co-channel interference to the AP 1 and that is of each hidden node.

According to the interference source identification method described in the foregoing embodiments, the following describes the interference source identification method through a specific example.

The network in FIG. 3 is still used for description. If the collection period is 5 seconds, and the preset time period is 25 seconds, the interference source identification device obtains the first parameter from the collector every 25 seconds. At a time point, the interference source identification device obtains a plurality of co-channel interference rates $CCI_{AP1}=\{20\%, 22\%, 23\%, 21\%, 24\%\}$ of the AP 1, a plurality of receive channel utilization rates $RX_{AP2}$ $\{40\%, 46\%, 47\%, 43\%, 49\%\}$ of the AP 2, a plurality of transmit channel utilization rates $TX_{AP2}=\{30\%, 36\%, 18\%, 31\%, 19\%\}$ of the AP 2, and a plurality of receive frame rates $V_{STA}=\{1000, 1400, 1450, 1250, 1500\}$ of the AP 2.

After the first parameter is obtained, because a quantity of pieces of data in each of the $CCI_{AP1}$, the $RX_{AP2}$, and the $TX_{AP2}$ is 5, a correlation coefficient may be any one of the Pearson correlation coefficient, the Spearman correlation coefficient, the Kendall correlation coefficient, or the time warping distance. In this embodiment of this application, an example in which the Pearson correlation coefficient is calculated is used for description. The first correlation threshold is 0.7, the second correlation threshold is 0.3, the third correlation threshold is 0.7, and the receive frame rate threshold $TH_{sta}$ is 1000. The Pearson correlation coefficient is defined as follows a Pearson correlation coefficient $\rho(X, Y)$ between two variables $(X, Y)$ is a ratio of a covariance $cov(X, Y)$ between two variables to a standard deviation product of two consecutive variables, namely:

$$\rho(X, Y) = \frac{cov(X, Y)}{\sigma_x \sigma_y} = \frac{E(XY) - E(X)E(Y)}{\sigma_x \sigma_y}.$$

$E(X)$ represents a mathematical expectation of the variable X. $E(Y)$ represents a mathematical expectation of the variable Y. $E(XY)$ represents a mathematical expectation of XY. $\sigma X$ represents a standard deviation of the variable X. $\sigma Y$ represents a standard deviation of the variable Y.

Correspondingly, in this embodiment of this application, a calculation formula of a correlation coefficient $P1(CCI_{AP1}, RX_{AP2})$ between the co-channel interference rate and the receive channel utilization rate is:

$$P1(CCI_{API}, RX_{AP2}) = \frac{cov(CCI_{AP1}, RX_{AP2})}{\sigma_{CCI_{AP1}} \sigma_{RX_{AP2}}} = \qquad \text{(Formula 1)}$$

$$\frac{E(CCI_{AP1} RX_{AP2}) - E(CCI_{AP1})E(RX_{AP2})}{\sigma_{CCI_{AP1}} \sigma_{RX_{AP2}}}.$$

$E(CCI_{AP1})$ represents a mathematical expectation of the five co-channel interference rates in the variable $CCI_{AP1}$. $E(RX_{AP2})$ represents a mathematical expectation of the five receive channel utilization rates in the variable $RX_{AP2}$. $E(CCI_{AP1}RX_{AP2})$ represents a mathematical expectation of $CCI_{AP1}RX_{AP2}$. $\sigma CCI_{AP1}$ represents a standard deviation of the variable $CCI_{AP1}$. $\sigma RX_{AP2}$ represents a standard deviation of the variable $RX_{AP2}$.

A calculation formula of a correlation coefficient $P2(CCI_{AP1}, TX_{AP2})$ between the co-channel interference rate and the transmit channel utilization rate is:

$$P1(CCI_{API}, TX_{AP2}) = \frac{cov(CCI_{AP1}, TX_{AP2})}{\sigma_{CCI_{AP1}} \sigma_{TX_{AP2}}} = \qquad \text{(Formula 2)}$$

$$\frac{E(CCI_{AP1} TX_{AP2}) - E(CCI_{AP1})E(TX_{AP2})}{\sigma_{CCI_{AP1}} \sigma_{TX_{AP2}}}.$$

$E(TX_{AP2})$ represents a mathematical expectation of the five transmit channel utilization rates in the variable $TX_{AP2}$. $E(CCI_{AP1}TX_{AP2})$ represents a mathematical expectation of $CCI_{AP1}TX_{AP2}$. $\sigma TX_{AP2}$ represents a standard deviation of the variable $TX_{AP2}$.

A calculation formula of a correlation coefficient $P3(V_{STA}, RX_{AP2})$ between the receive frame rate and the transmit channel utilization rate is:

$$P3(V_{STA}, RX_{AP2}) = \qquad \text{(Formula 3)}$$

$$\frac{cov(V_{STA}, RX_{AP2})}{\sigma_{V_{STA}} \sigma_{RX_{AP2}}} = \frac{E(V_{STA} RX_{AP2}) - E(V_{STA})E(RX_{AP2})}{\sigma_{V_{STA}} \sigma_{RX_{AP2}}}.$$

$E(V_{STA})$ represents a mathematical expectation of the five receive frame rates in the variable $V_{STA}$. $E(V_{STA}RX_{AP2})$ represents a mathematical expectation of $V_{STA}RX_{AP2}$. $\sigma V_{STA}$ represents a standard deviation of the variable $V_{STA}$.

According to the formula 1 and to the formula 3, $P(CCI_{AP1}, RX_{AP2})=0.9841$, $P2(CCI_{AP1}, TX_{AP2})=0.2562$, and $P3(V_{STA}, RX_{AP2})=0.9343$ are obtained through calculation. The receive frame rate mean value in the preset time period is 1320. In this case, $P1(CCI_{AP1}, RX_{AP2})$ is greater than the first correlation threshold that is 0.7, $P2(CCI_{AP1}, TX_{AP2})$ is less than the second correlation threshold that is 0.3, and $P3(V_{STA}, RX_{AP2})$ is greater than the third correlation threshold that is 0.7. In addition, the receive frame rate mean value is greater than the receive frame rate threshold, that is, the co-channel interference rate is correlated with the receive channel utilization rate, the co-channel interference rate is not correlated with the transmit channel utilization rate, the receive frame rate is correlated with the receive channel utilization rate, and the receive frame rate mean value is greater than the receive frame rate threshold. Therefore, it is determined that the data sent by the STA 1 to the AP 2 causes the co-channel interference to the AP 1.

Figure 6:
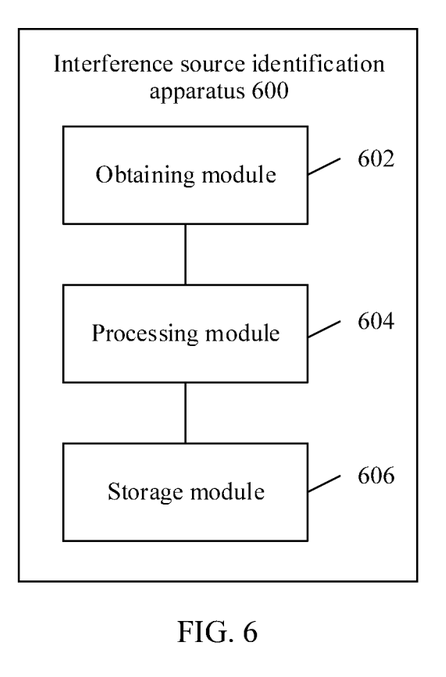
FIG. 6 is a schematic structural diagram of an interference source identification apparatus according to an embodiment of this application.

With reference to related descriptions in the embodiments in FIG. 1 to FIG. 5, the following describes related apparatuses to which the embodiments of this application are applicable. FIG. 6 is a schematic structural diagram of an interference source identification apparatus according to an embodiment of this application. The apparatus 600 includes an obtaining module 602 and a processing module 604. The processing module 604 may be configured to control and manage an action of the interference source identification apparatus 600. For example, the processing module 604 is configured to perform the step S120 in FIG. 4 or the step S1201 and the step S1202 in FIG. 5, and/or is configured to perform other content of the technology described in the method embodiment of this application. The obtaining module 602 is configured to communicate with another module or device. For example, the obtaining module 602 is configured to perform the step S110 in FIG. 4, and/or is configured to perform other content of the technology described in this application.

Optionally, the interference source identification apparatus 600 may further include a storage module 606. The storage module 606 is configured to store program code and data of the interference source identification apparatus 600, for example, store program code used for identifying an interference source. The processing module 604 is configured to invoke the program code in the storage module 606 to implement the implementation steps performed by the interference source identification apparatus in the embodiment shown in FIG. 4 or FIG. 5, and/or other content steps of the technology described in this application.

The processing module 604 may be a processor or a controller, such as may be a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination including one or more microprocessors, or a combination of the DSP and a microprocessor. The obtaining module 602 may be a communications interface, a transceiver, a transceiver circuit, or the like. The communications interface is a general name, and may include one or more interfaces such as an interface between a communications module and the processing module, and an interface between the interference source identification apparatus and user equipment. The storage module 606 may be a memory, or another service or module configured to provide a storage function.

Figure 7:
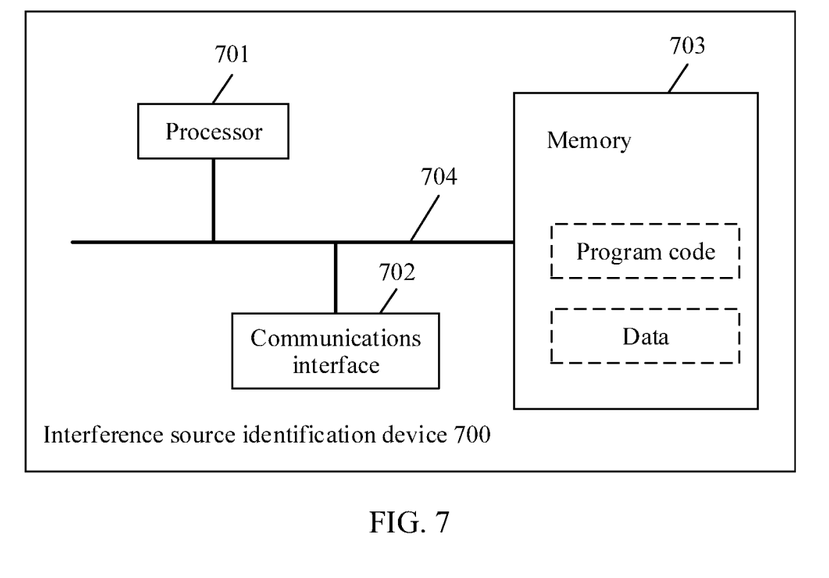
FIG. 7 is a schematic structural diagram of an interference source identification device according to an embodiment of this application.

Referring to FIG. 7, FIG. 7 shows an interference source identification device 700 according to an embodiment of this application. The interference source identification device 700 includes one or more processors 701, a communications interface 702, and a memory 703. The processor 701, the communications interface 702, and the memory 703 may be connected to each other through a bus 704.

The processor 701 may include one or more general purpose processors, for example, one or more CPUs. The processor may be configured to run related program code to implement a function of the foregoing processing module. Further, the processor 701 may be configured to run related program code in the memory 703 to perform the step S120 in FIG. 4 or the step S1201 and the step S1202 in FIG. 5, and/or other content of the technology described in the method embodiment of this application.

The communications interface 702 may be a wired interface (for example, an Ethernet interface) or a wireless interface (for example, a cellular network interface or a wireless local area network interface), and is configured to communicate with another module or device. For example, the communications interface 702 in this embodiment of this application may be further configured to receive the foregoing first parameter.

The memory 703 may include a volatile memory such as a random-access memory (RAM), or the memory may include a non-volatile memory such as a read-only memory (ROM), a flash memory, a hard disk drive (HDD), or a solid-state drive (SSD), or the memory 703 may include a combination of the foregoing types of memories. The memory may be configured to store a group of program code and data such that the processor invokes the program code and the data stored in the memory to implement functions of the communications module and/or the processing module in the embodiments of this application. This is not limited in the embodiments of this application.

It should be noted that FIG. 4 or FIG. 5 are possible implementations of the embodiments of this application. In actual application, the interference source identification device may further include more or fewer components. This is not limited herein. For content that is not shown or not described in this embodiment of this application, refer to related descriptions in the foregoing method embodiment. Details are not described herein again.

An embodiment of this application further provides a computer non-transient storage medium. The computer non-transient storage medium stores an instruction. When the instruction is run on a processor, the processor performs the steps S110 and S120 in FIG. 4 or the steps S1201 and S1202 in FIG. 5, and/or is configured to perform other steps performed by interference source identification in the method embodiment of this application.

Methods or algorithm steps described in combination with the content disclosed in the embodiments of this application may be implemented by hardware, or may be implemented by the processor by executing a software instruction. The software instruction may include a corresponding software module. The software module may be stored in a RAM, a flash memory, a ROM, an erasable programmable ROM (EPROM), an electrically EPROM (EEPROM), a register, a hard disk, a removable hard disk, a compact disc (CD) ROM (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in an ASIC. In addition, the ASIC may be located in a computing device. Certainly, the processor and the storage medium may exist in the computing device as discrete components.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium includes: any medium that can store program code, such as a ROM, a RAM, a magnetic disk, or a compact disc.

What is claimed is:

1. An interference source identification method comprising:

obtaining a first parameter comprising a co-channel interference rate of a first access point in a preset time period, a receive channel utilization rate of a second access point in the preset time period, a transmit channel utilization rate of the second access point in the preset time period, and a receive frame rate of first data received from a first station by the second access point in the preset time period, wherein the preset time period comprises a plurality of first sampling periods, wherein the co-channel interference rate comprises a first ratio of a second sampling period and a first time period that the first access point receives interference data in the second sampling period, wherein the receive channel utilization rate comprises a second ratio of the second sampling period and a second time period that the second access point receives wanted data in the second sampling period, wherein the transmit channel utilization rate comprises a third ratio of the second sampling period and a third time period that the second access point sends second data in the second sampling period, and wherein the receive frame rate is of third data received from the first station by the second access point in the second sampling period; and determining that the first data causes co-channel interference to the first access point when the first parameter meets a first preset condition.

2. The interference source identification method of claim 1, further comprising further determining that the first data causes the co-channel interference to the first access point when the co-channel interference rate is correlated with the receive channel utilization rate, the co-channel interference rate is not correlated with the transmit channel utilization rate, the receive frame rate is correlated with the receive channel utilization rate, and a receive frame rate mean value of the receive frame rate is greater than a receive frame rate threshold, wherein the receive frame rate mean value is of receive frame rates collected in the first sampling periods.

3. The interference source identification method of claim 2, further comprising:

determining that the co-channel interference rate is correlated with the receive channel utilization rate when a first absolute value of a first correlation coefficient between the co-channel interference rate and the receive channel utilization rate is greater than a first correlation threshold, wherein the first correlation coefficient comprises any one of a Pearson correlation coefficient, a Spearman correlation coefficient, or a Kendall correlation coefficient;

determining that the co-channel interference rate is not correlated with the transmit channel utilization rate when a second absolute value of a second correlation coefficient between the co-channel interference rate and the transmit channel utilization rate is less than a second correlation threshold, wherein the second correlation coefficient comprises any one of the Pearson correlation coefficient, the Spearman correlation coefficient, or the Kendall correlation coefficient; and determining that the receive frame rate is correlated with the receive channel utilization rate when a third absolute value of a third correlation coefficient between the receive frame rate and the receive channel utilization rate is greater than a third correlation threshold, wherein the third correlation coefficient comprises any one of the Pearson correlation coefficient, the Spearman correlation coefficient, or the Kendall correlation coefficient.

4. The interference source identification method of claim 2, further comprising:

determining that the co-channel interference rate is correlated with the receive channel utilization rate when a fourth absolute value of a fourth correlation coefficient between the co-channel interference rate and the receive channel utilization rate is less than a fourth correlation threshold;

determining that the co-channel interference rate is not correlated with the transmit channel utilization rate when a fifth absolute value of a fifth correlation coefficient between the co-channel interference rate and the transmit channel utilization rate is greater than a fifth correlation threshold; and determining that the receive frame rate is correlated with the receive channel utilization rate when a sixth absolute value of a sixth correlation coefficient between the receive frame rate and the receive channel utilization rate is less than a sixth correlation threshold, wherein the fourth correlation coefficient, the fifth correlation coefficient, and the sixth correlation coefficient are time warping distances.

5. The interference source identification method of claim 1, further comprising:

determining a second parameter comprising at least one of a co-channel interference rate mean value, a co-channel interference rate peak value, or a co-channel interference rate proportion, wherein the co-channel interference rate mean value is of a plurality of co-channel interference rates collected in the preset time period, wherein the co-channel interference rate peak value is a maximum value of the co-channel interference rates, and wherein the co-channel interference rate proportion is of co-channel interference rates that are greater than the co-channel interference rate mean value; and further determining that the first data causes the co-channel interference to the first access point when the co-channel interference rate mean value is greater than a co-channel interference rate mean value threshold, the co-channel interference rate peak value is greater than a co-channel interference rate peak value threshold, and the co-channel interference rate proportion is greater than a co-channel interference rate proportion threshold.

6. The interference source identification method of claim 1, further comprising further obtaining the first parameter from a collector.

7. An interference source identification apparatus, comprising:

a memory configured to store computer-readable instructions; and a processor coupled to the memory, wherein the computer-readable instructions cause the processor to be configured to:

obtain a first parameter comprising a co-channel interference rate of a first access point in a preset time period, a receive channel utilization rate of a second access point in the preset time period, a transmit channel utilization rate of the second access point in the preset time period, and a receive frame rate of first data received from a first station by the second access point in the preset time period, wherein the preset time period comprises a plurality of first sampling periods, wherein the co-channel interference rate comprises a first ratio of a second sampling period and a first time period that the first access point receives interference data in the second sampling period, wherein the receive channel utilization rate comprises a second ratio of the second sampling period and a second time period that the second access point receives wanted data in the second sampling period, wherein the transmit channel utilization rate comprises a third ratio of the second sampling period and a third time period that the second access point sends second data in the second sampling period, and wherein the receive frame rate is of a third data received from the first station by the second access point in the second sampling period; and determine that the first data causes co-channel interference to the first access point when the first parameter meets a first preset condition.

8. The interference source identification apparatus of claim 7, wherein the computer-readable instructions further cause the processor to be configured to further determine that the first data causes the co-channel interference to the first access point when the co-channel interference rate is correlated with the receive channel utilization rate, the co-channel interference rate is not correlated with the transmit channel utilization rate, the receive frame rate is correlated with the receive channel utilization rate, and a receive frame rate mean value of the receive frame rate is greater than a receive frame rate threshold, and wherein the receive frame rate mean value is of receive frame rates collected in the first sampling periods.

9. The interference source identification apparatus of claim 8, wherein the computer-readable instructions further cause the processor to be configured to:
   determine that the co-channel interference rate is correlated with the receive channel utilization rate when a first absolute value of a first correlation coefficient between the co-channel interference rate and the receive channel utilization rate is greater than a first correlation threshold, wherein the first correlation coefficient comprises any one of a Pearson correlation coefficient, a Spearman correlation coefficient, or a Kendall correlation coefficient;
   determine that the co-channel interference rate is not correlated with the transmit channel utilization rate when a second absolute value of a second correlation coefficient between the co-channel interference rate and the transmit channel utilization rate is less than a second correlation threshold, wherein the second correlation coefficient comprises any one of the Pearson correlation coefficient, the Spearman correlation coefficient, or the Kendall correlation coefficient; and
   determine that the receive frame rate is correlated with the receive channel utilization rate when a third absolute value of a third correlation coefficient between the receive frame rate and the receive channel utilization rate is greater than a third correlation threshold, wherein the third correlation coefficient comprises any one of the Pearson correlation coefficient, the Spearman correlation coefficient, or the Kendall correlation coefficient.

10. The interference source identification apparatus of claim 8, wherein the computer-readable instructions further cause the processor to be configured to:
    determine that the co-channel interference rate is correlated with the receive channel utilization rate when a fourth absolute value of a fourth correlation coefficient between the co-channel interference rate and the receive channel utilization rate is less than a fourth correlation threshold;
    determine that the co-channel interference rate is not correlated with the transmit channel utilization rate when a fifth absolute value of a fifth correlation coefficient between the co-channel interference rate and the transmit channel utilization rate is greater than a fifth correlation threshold; and
    determine that the receive frame rate is correlated with the receive channel utilization rate when a sixth absolute value of a sixth correlation coefficient between the receive frame rate and the receive channel utilization rate is less than a sixth correlation threshold,
    wherein the fourth correlation coefficient, the fifth correlation coefficient, and the sixth correlation coefficient are time warping distances.

11. The interference source identification apparatus of claim 7, wherein the computer-readable instructions further cause the processor to be configured to:
    determine a second parameter comprising at least one of a co-channel interference rate mean value, a co-channel interference rate peak value, or a co-channel interference rate proportion, wherein the co-channel interference rate mean value is of a plurality of co-channel interference rates collected in the preset time period, wherein the co-channel interference rate peak value is a maximum value of the co-channel interference rates, and wherein the co-channel interference rate proportion is of co-channel interference rates that are greater than the co-channel interference rate mean value; and
    further determine that the first data causes the co-channel interference to the first access point when the co-channel interference rate mean value is greater than a co-channel interference rate mean value threshold, the co-channel interference rate peak value is greater than a co-channel interference rate peak value threshold, and the co-channel interference rate proportion is greater than a co-channel interference rate proportion threshold.

12. The interference source identification apparatus of claim 7, wherein the computer-readable instructions further cause the processor to be configured to further obtain the first parameter from a collector.

13. A computer program product comprising computer-executable instructions stored on a non-transitory computer storage medium that, when executed by a processor, cause an apparatus to:
    obtain a first parameter comprising a co-channel interference rate of a first access point in a preset time period, a receive channel utilization rate of a second access point in the preset time period, a transmit channel utilization rate of the second access point in the preset time period, and a receive frame rate of first data received from a first station by the second access point in the preset time period, wherein the preset time period comprises a plurality of first sampling periods, wherein the co-channel interference rate comprises a first ratio of a second sampling period and a first time period that the first access point receives interference data in the second sampling period, wherein the receive channel utilization rate comprises a second ratio of the second sampling period and a second time period that the second access point receives wanted data in the second sampling period, wherein the transmit channel utilization rate comprises a third ratio of the second sampling period and a third time period that the second access point sends second data in the second sampling period, and wherein the receive frame rate is of third data received from the first station by the second access point in the second sampling period; and
    determine that the first data causes co-channel interference to the first access point when the first parameter meets a first preset condition.

14. The computer program product of claim 13, wherein the computer-executable instructions further cause the apparatus to further determine that the first data causes the co-channel interference to the first access point when the co-channel interference rate is correlated with the receive channel utilization rate, the co-channel interference rate is not correlated with the transmit channel utilization rate, the receive frame rate is correlated with the receive channel utilization rate, and a receive frame rate mean value of the receive frame rate is greater than a receive frame rate threshold, and wherein the receive frame rate mean value is of receive frame rates collected in the first sampling periods.

15. The computer program product of claim 14, wherein the computer-executable instructions further cause the apparatus to:

determine that the co-channel interference rate is correlated with the receive channel utilization rate when a first absolute value of a first correlation coefficient between the co-channel interference rate and the receive channel utilization rate is greater than a first correlation threshold, wherein the first correlation coefficient comprises any one of a Pearson correlation coefficient, a Spearman correlation coefficient, or a Kendall correlation coefficient;

determine that the co-channel interference rate is not correlated with the transmit channel utilization rate when a second absolute value of a second correlation coefficient between the co-channel interference rate and the transmit channel utilization rate is less than a second correlation threshold, wherein the second correlation coefficient comprises any one of the Pearson correlation coefficient, the Spearman correlation coefficient, or the Kendall correlation coefficient; and determine that the receive frame rate is correlated with the receive channel utilization rate when a third absolute value of a third correlation coefficient between the receive frame rate and the receive channel utilization rate is greater than a third correlation threshold, wherein the third correlation coefficient comprises any one of the Pearson correlation coefficient, the Spearman correlation coefficient, or the Kendall correlation coefficient.

16. The computer program product of claim 14, wherein the computer-executable instructions further cause the apparatus to:

determine that the co-channel interference rate is correlated with the receive channel utilization rate when a fourth absolute value of a fourth correlation coefficient between the co-channel interference rate and the receive channel utilization rate is less than a fourth correlation threshold;

determine that the co-channel interference rate is not correlated with the transmit channel utilization rate when a fifth absolute value of a fifth correlation coefficient between the co-channel interference rate and the transmit channel utilization rate is greater than a fifth correlation threshold; and determine that the receive frame rate is correlated with the receive channel utilization rate when a sixth absolute value of a sixth correlation coefficient between the receive frame rate and the receive channel utilization rate is less than a sixth correlation threshold, wherein the fourth correlation coefficient, the fifth correlation coefficient, and the sixth correlation coefficient are time warping distances.

17. The computer program product of claim 13, wherein the computer-executable instructions further cause the apparatus to:

determine a second parameter comprising at least one of a co-channel interference rate mean value, a co-channel interference rate peak value, or a co-channel interference rate proportion, wherein the co-channel interference rate mean value is of a plurality of co-channel interference rates collected in the preset time period, wherein the co-channel interference rate peak value is a maximum value of the co-channel interference rates, and wherein the co-channel interference rate proportion is of co-channel interference rates that are greater than the co-channel interference rate mean value; and further determine that the first data causes the co-channel interference to the first access point when the co-channel interference rate mean value is greater than a co-channel interference rate mean value threshold, the co-channel interference rate peak value is greater than a co-channel interference rate peak value threshold, and the co-channel interference rate proportion is greater than a co-channel interference rate proportion threshold.

18. The interference source identification method of claim 1, further comprising determining that the first data causes the co-channel interference to the first access point when a second parameter meets a second preset condition, wherein the second parameter comprises at least one of a co-channel interference rate mean value, a co-channel interference rate peak value, or a co-channel interference rate proportion.

19. The interference source identification apparatus of claim 7, wherein the computer-readable instructions further cause the processor to be configured to determine that the first data causes the co-channel interference to the first access point when a second parameter meets a second preset condition, and wherein the second parameter comprises at least one of a co-channel interference rate mean value, a co-channel interference rate peak value, or a co-channel interference rate proportion.

20. The computer program product of claim 13, wherein the computer-executable instructions further cause the apparatus to further obtain the first parameter from a collector.

* * * * *